United States Patent [19]
Fraidl et al.

[11] Patent Number: 5,762,041
[45] Date of Patent: Jun. 9, 1998

[54] FOUR-STROKE INTERNAL COMBUSTION ENGINE

[75] Inventors: Günter Karl Fraidl, Pirka; Walter Piock; Martin Wirth, both of Hitzendorf, all of Austria

[73] Assignee: AVL Gesellschaft fuer Verbrennungskraft-maschinen und Messtechnik mbH,, Graz, Australia

[21] Appl. No.: 717,828

[22] Filed: Sep. 23, 1996

[30] Foreign Application Priority Data

Sep. 22, 1995 [AT] Austria .................... 1576/95

[51] Int. Cl.⁶ .................................. F02B 31/00
[52] U.S. Cl. .......................................... 123/308
[58] Field of Search ................ 123/308, 188.14, 123/432, 337, 403, 405, 442

[56] References Cited

U.S. PATENT DOCUMENTS

| | | | |
|---|---|---|---|
| 5,479,889 | 1/1996 | Sato et al. | 123/308 |
| 5,549,088 | 8/1996 | Isaka | 123/308 |
| 5,592,916 | 1/1997 | Stockhausen et al. | 123/308 |

FOREIGN PATENT DOCUMENTS

| | | |
|---|---|---|
| 0 390 589 A3 | 10/1990 | European Pat. Off. . |
| 0 449 240 A1 | 10/1991 | European Pat. Off. . |
| 0 532 020 A1 | 3/1993 | European Pat. Off. . |
| 0 537 745 A1 | 4/1993 | European Pat. Off. . |
| 0 558 073 A1 | 9/1993 | European Pat. Off. . |
| 0 558 081 A1 | 9/1993 | European Pat. Off. . |
| 0 594 462 A1 | 4/1994 | European Pat. Off. . |
| 34 44 356 A1 | 6/1985 | Germany . |
| 41 08 469 A1 | 9/1991 | Germany . |
| 42 33 640 A1 | 4/1993 | Germany . |

*Primary Examiner*—Raymond A. Nelli
*Attorney, Agent, or Firm*—Herbert L. Lerner; Laurence A. Greenberg; Werner H. Stemer

[57] ABSTRACT

A four-stroke internal combustion engine with a gabled combustion chamber and at least two intake valves and at least two intake conduits per cylinder, of which a first intake conduit is embodied as unthrottled and a second intake conduit has a throttle device. To attain a stable radial mixture layering, it is provided that the fuel injection valve is disposed in the second intake conduit, and the throttle device in the closed state produces a defined minimum flow rate of between about 5% and about 20%, preferably about 10%, of the maximum flow rate, and that viewed in the direction of the crankshaft axis the center line of the first intake conduit in the intake valve region has a greater radius of curvature than does the center line of the second intake conduit.

14 Claims, 4 Drawing Sheets

FOUR-STROKE INTERNAL COMBUSTION ENGINE

BACKGROUND OF THE INVENTION

1. Field of the Invention

The invention relates to a four-stroke internal combustion engine, having a gabled combustion chamber and at least two intake valves per cylinder, having at least two intake conduits leading to the intake valves, of which a first intake conduit is embodied unthrottled and a second intake conduit has a throttle device actuatable as a function of the engine load, wherein—viewed in the direction of the crankshaft axis—the center line of the first intake conduit directly at the intake valve forms a larger angle with a longitudinal plane defined by the cylinder axis and the crankshaft axis than does a center line of the second intake conduit, and wherein—viewed in the direction of the cylinder axis—the center line of the first intake conduit at the entrance to the combustion chamber forms a larger angle with a first plane enclosing the cylinder axis and the center of the intake valve of the first intake conduit, than does a center line of the second intake conduit forms with a second plane enclosing the cylinder axis and the center of an intake valve of the second intake conduit, and having a fuel injection valve discharging into one of the intake conduits and having a spark plug disposed centrally in the combustion chamber.

2. Description of the Related Art

Constantly changing demands with regard to fuel consumption and the reduction of exhaust emissions, especially of hydrocarbons and nitrogen oxides, necessitate the use of new technologies in the field of combustion engines.

One essential reason for the higher specific fuel consumption of an internal combustion engine with externally supplied ignition, compared with diesel engines, for instance, resides in the mode of operation, with a premixed, homogeneous fuel-air mixture. This requires regulating the engine load with the aid of a throttle device to limit the total aspirated mixture quantity (quantity regulation).

The throttling of the intake flow causes a thermodynamic loss, which increases the fuel consumption of the engine. The potential for reducing engine consumption by circumventing the throttling can be estimated as about 25%. Some of the potential improvement can be utilized if a reduction in throttling is possible in the partial-load range. However, for a given fuel quantity this is possible only by leaning down the mixture or by recirculating exhaust gas (EGR). Accordingly, steps must be taken to increase the leaning down capability or the exhaust gas recirculation compatibility of the engine while simultaneously maintaining the same emission values or reducing them.

A reduction in uncombusted hydrocarbons with overall super-stoichiometric combustion is promoted by mixture layering, which leads to local enrichment of the mixture. The combustion then proceeds locally in a richer mixture compared with the overall air ratio. The increased nitrogen oxide formation involved in the approximately stoichiometric combustion can be ascribed to the maximum combustion temperatures (thermal nitrogen oxide formation). The most effective strategy for reducing nitrogen oxides is to slow down the process of combustion by means of exhaust gas recirculation.

An internal combustion engine with at least two inlet or intake valves offers the possibility of supplying different mixture compositions to the combustion chamber via separate intake conduits. The flow in the cylinder chamber can be varied, with the aid of the design of the inlet devices of the engine, in such a way that at the instant of ignition, a mixture layered in the desired manner is located in the cylinder. It is especially advantageous if the richer mixture portion is located in the middle of the cylinder, in the region of a centrally disposed spark plug, while toward the cylinder wall either leaning down of the mixture or an increase in exhaust gas concentration is found.

This kind of inlet-generated mixture layering must be created and stabilized by means of the primary flow structures in the cylinder chamber of the engine, so that even in the presence of the very high degrees of turbulence in the internal flow in the engine, the layering can survive the compression process between the closure of the intake valves and ignition. Primary flow forms that can be considered are the vortex motions known as swirling and tumbling. In the case of the swirling flow, the cylinder charge, because of the intake conduit design, rotates about the cylinder axis, while in the case of a tumbling flow rotation about an axis parallel to the crankshaft can be observed.

In principle, the swirling flow offers the better preconditions for maintaining a mixture layering during compression, since the round cylinder cross section at right angles to the cylinder axis does not change during the compression. A tumbling vortex, conversely, has a substantially greater tendency during compression, because of the increasing flattening at right angles to the crankshaft axis of the cross section available for its rotation and because of the resultant deformation of the vortex, of breaking down into random turbulence structures by shearing action. Tumbling flows are therefore preferably employed if a general speeding up of combustion by increasing the level of turbulence in the entire combustion chamber is sought.

There has become known heretofore from European patent disclosure EP 0 537 745 A1, an internal combustion engine of the type referred to at the outset in which a first primary intake conduit, in which the fuel injection takes place, creates a swirling flow and a second intake conduit, which can be added at high engine load, creates a flow with tumbling characteristics. The goal there, however, is not layering but rather a pure increase in the combustion speed and an improvement in ignition conditions from the increased charge movement attendant with the swirling flow and in the above-mentioned combustion-accelerating effect of the tumbling flow.

Numerous configurations for generating a charge layering are known. For instance, an internal combustion engine is known from European patent application EP 0 594 462 A1 or EP 0 390 589 A2, in which the goal of achieving layering of the mixture in the cylinder chamber that has a gradient in the air ratio in the direction of the crankshaft axis is pursued by means of injecting the fuel into one of two intake conduits on the basis of a tumbling flow. With this kind of dividing up of the inlet flow into two partial streams of differing mixture composition, a rich region on one side of the cylinder and a correspondingly lean region on the opposite side of the cylinder results, while at the centrally disposed spark plug, a medium air ratio, in terms of the total charge, with pronounced cyclical fluctuations prevails. The resultant asymmetrical propagation of the flame does not offer optimal conditions for ignition and thermodynamically optimal combustion.

By splitting the inlet flow into three partial streams, better layering is sought on a tumbling basis in German patent disclosure DE 42 33 640 A1 and European patent disclosures EP 0 558 081 A1 and EP 0 558 073 A1. This is accomplished either by using three intake valves with separate conduits or by using partitions in the single joint intake conduit for two intake valves. By introducing the fuel only into the middle partial stream, enrichment of the mixture in the middle of the cylinder is attained, but this layering does not represent radial layering but instead comprises flat layers at right angles to the crankshaft axis. One essential problem in maintaining this kind of triple layering during the compression phase resides in the fact that a tumbling motion during compression sometimes changes into two adjacent vortices rotating in opposite directions, whose axis of rotation is at right angles to the crankshaft axis. These vortex motions, also known as omega tumblings, contribute strongly to mixing up of this kind of triple layering.

An internal combustion engine with three intake valves is shown in European patent disclosure EP 0 449 240 A1, of which two valves serve in a conventional arrangement solely to aspirate air, and a swirling flow can be generated by turning off one valve. A third intake valve, carrying the mixture, is disposed centrally in the combustion chamber and communicates with a swirling-generating spiral intake conduit. The intent is to attain a radial mixture layering, although with the aid of an unconventional valve configuration that deviates sharply from the modern mass-produced standard. There is no possibility of a centrally disposed spark plug.

SUMMARY OF THE INVENTION

It is accordingly an object of the invention to provide a four-stroke internal combustion engine, which overcomes the above-mentioned disadvantages of the heretofore-known devices and methods of this general type and which achieves stable radial mixture layering, the configuration of which can be varied with the engine load.

With the foregoing and other objects in view there is provided, in accordance with the invention, a four-stroke internal combustion engine, comprising:

a crankshaft having a crankshaft axis; a plurality of cylinders each having a cylinder axis and enclosing a gabled combustion chamber with a reciprocating piston attached to the crankshaft and a spark plug disposed centrally in the combustion chamber; and at least a first and a second intake valve per cylinder communicating with a respective the combustion chamber;

a first, unthrottled intake conduit and a second intake conduit respectively leading to the first and second intake valves and each defining a respective center line and a respective radius of curvature;

wherein—viewed in a direction of the crankshaft axis—the center line of the first intake conduit directly at the intake valve encloses a greater angle with a longitudinal plane defined by the cylinder axis and the crankshaft axis than a center line of the second intake conduit, and wherein—viewed in a direction of the cylinder axis—the center line of the first intake conduit at an entrance to the combustion chamber encloses an angle with a first plane defined by the cylinder axis and a center of the first intake valve which is greater than an angle enclosed between the center line of the second intake conduit and a second plane defined by the cylinder axis and the center of the second intake valve;

a fuel injection valve discharging into the second intake conduit, and a throttle device in the second intake conduit, the throttle device being actuatable as a function of an engine load;

the throttle device having an open position for a maximum flow rate, and a closed position for a defined minimum flow rate of between approximately 5% and approximately 20% of the maximum flow rate; and wherein—viewed in the direction of the crankshaft axis the center line of the first intake conduit in a vicinity of the first intake valve has a greater radius of curvature than the center line of the second intake conduit.

In other words, the objects of the invention are satisfied, this is attained in that the fuel injection valve is disposed in the throttleable second intake conduit, and the throttle device in the closed state produces a defined minimum flow rate of between about 5% and about 20%, preferably about 10%, of the maximum flow rate, and that viewed in the direction of the crankshaft axis—the center line of the first intake conduit in the intake valve region has a greater radius of curvature than does the center line of the second intake conduit. The first intake conduit is embodied as a so-called tangential conduit. The conduit is inclined sharply relative to the valve axis, with only slight curvature, and generates a flow that strikes the cylinder wall at a tangent and leads to the development of a pronounced swirling motion in the cylinder. A second intake conduit is embodied as a so-called neutral conduit. This conduit has a greater curvature than does the tangential conduit and a lesser inclination relative to the valve axis. It produces an inflow aimed approximately at the center of the cylinder; this causes neither a pronounced swirling motion nor a tumbling motion. The injection of the fuel takes place solely into this neutral conduit. The throttle device in the neutral conduit serves to achieve an increased layering effect by throttling, in the lower partial-load region of the engine performance graph. If air-reinforced injection nozzles are used for introducing the fuel, then the quantity of air introduced by the air reinforcement must also be taken into account by means of suitably increased throttling of the main air flow in the neutral conduit.

By throttling the mixture-carrying neutral conduit, it is attained that the inflow of the charge from this conduit enters the cylinder chamber with a lesser impetus than does the air supplied by the tangential conduit. The total flow field in the cylinder chamber is thus dominated by the unthrottled tangential conduit, which carries pure air or air and recirculated exhaust gas. Additionally, because of the reduction in the air quantity that flows through the neutral conduit, an enrichment of the mixture created there takes place; that is, the difference in the mixture compositions of the streams in the two conduits is increased still further. This improves the precondition that after the compression operation as well, which always involves progressive turbulent mixing of the two partial streams, adequate layering of the fuel-air mixture still prevails. The stabilization of the richer mixture components in the center of the cylinder is reinforced by the swirling flow.

The attainable layering of the fuel-air mixture is in a direct relationship with the possible unthrottling of the engine at partial load.

In engines with two intake valves, the previously throttled neutral conduit is opened at elevated load, so that the neutral and the tangential streams flow in with the same impetus. While a residual swirl is preserved, this leads to a more pronounced homogenization of the mixture.

The throttle device may be embodied as a throttle valve or as a slide. In the case of the throttle valve, the minimum flow rate is accomplished by means of an annular gap of constant width over its circumference between the throttle valve and the conduit wall; the cross-sectional area of this gap is between about 5% and about 20% of the conduit cross section. In the case of a slide, which may be either a flat slide or a rotary slide, at least one opening but preferably a plurality of uniformly distributed openings is provided on the slide surface.

In another variant embodiment, the throttle device may be embodied as a diaphragm valve.

In a preferred variant embodiment, it is provided that the throttle device is embodied by a variable intake valve controller, and the minimum flow rate is realized by means of a controlled reduction of the valve stroke and/or a variation in the valve opening time.

If the unthrottling of the engine is utilized not for leaning down the mixture but rather to increase the delivery of recirculated exhaust gas with an otherwise stoichiometric mixture, then it is advantageous if at least the fuel-valveless intake conduits can be made to communicate with an exhaust gas recirculation line.

The throttling of the mixture-carrying intake conduit also has a pronounced advantage in non-steady-state operation of the engine. Normally, a sudden load increase causes a brief leaning down of the fuel-air mixture, because of the wall film development that is dependent on the intake tube pressure. At partial load and low intake tube pressure, a slighter wall film forms than at higher load with correspondingly increased intake tube pressure, so that upon a load increase initially a larger wall film forms. If there is a sudden drop in load, correspondingly a brief excessive enrichment of the mixture ensues because of a delayed breakdown of the wall film. Upon throttling of the mixture-carrying conduit, even at partial load, because of the lesser negative pressure and mass flow rate, a thicker wall film now develops between the injection device and the intake valve, so that upon a sudden load increase with a simultaneous unthrottling of the mixture-carrying conduit, the delayed adaptation of the wall film to the altered pressure and flow conditions occurs in attenuated fashion, leading to improved constancy of the air ratio in non-steady-state operation.

In one feature of the invention, three intake valves are provided, and the second intake conduit communicates with two adjacent intake valves. The joint second intake conduit leads to one lateral and one center intake valve; the second intake conduit, in accordance with the two-valve version, can be throttled down to a defined minimum flow rate. The fuel is injected exclusively into this second intake conduit.

In a further feature of the invention, it is advantageous if three intake valves and, in addition to the first and second intake conduits, a third intake conduit are provided, and each of the intake conduits disposed side by side—as viewed in the direction of the cylinder axis—is embodied separately as far as the intake valve, and the second intake conduit is disposed centrally, and a turnoff device is preferably disposed in the third intake conduit. The third intake conduit is then, like the first intake conduit, embodied as a tangential conduit that carries only air, and it is opened by the turnoff device only in the upper partial-load range and at full load. The two tangential conduits together generate a tumbling motion in the cylinder chamber, which meets the neutral inflow of the mixture-carrying middle second intake conduit, leading to increased turbulence and mixing of the individual partial streams. This reinforces the homogenization of the mixture that is necessary at high loads, even though injection continues only into one intake conduit.

Other features which are considered as characteristic for the invention are set forth in the appended claims.

Although the invention is illustrated and described herein as embodied in a four-stroke internal combustion engine, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
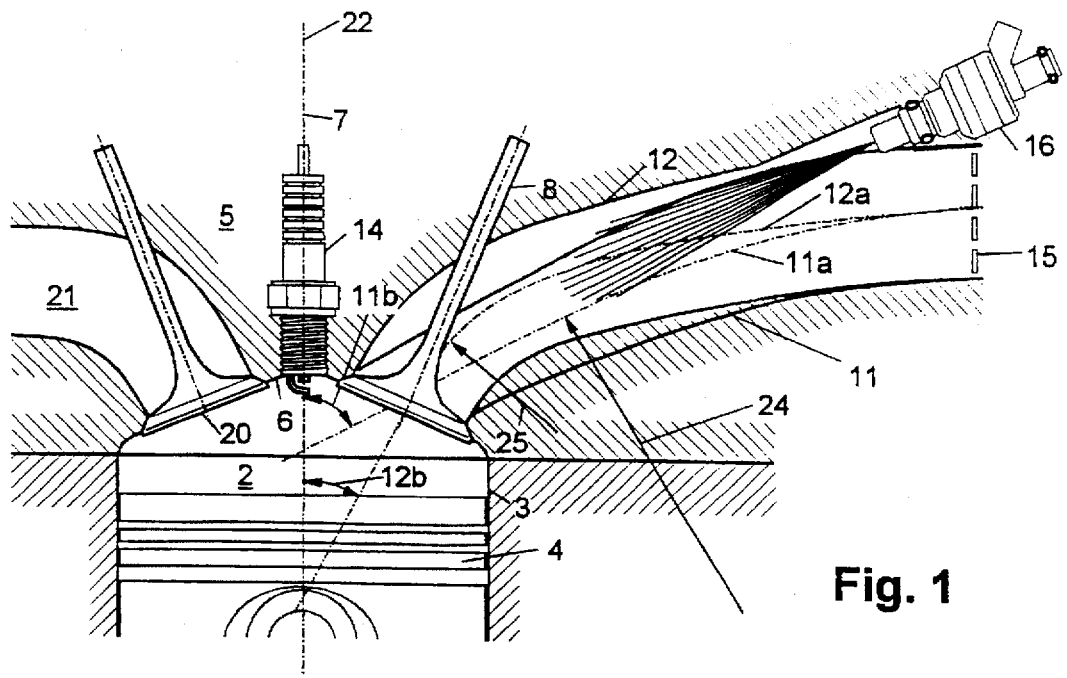
FIG. 1 is a cross section through the internal combustion engine according to the invention, in the direction of the crankshaft axis.
Figure 2:
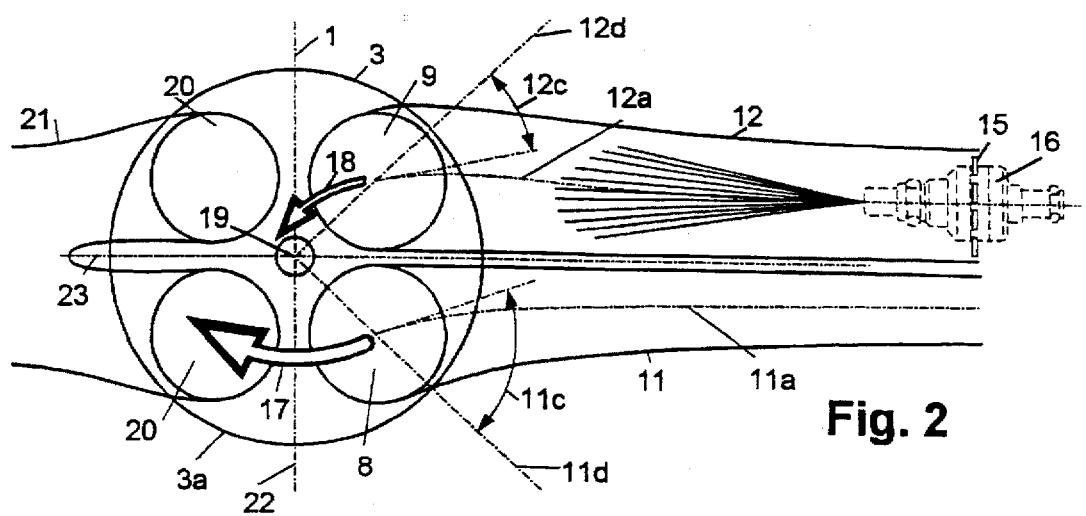
FIG. 2 is a diagrammatic plan view thereof in the direction of the cylinder axis.

Referring now to the figures of the drawing in detail and first, particularly, to FIGS. 1 and 2 thereof, there is seen an internal combustion engine (the cross section of FIG. 1 is taken in the direction of a crankshaft axis 1 in FIG. 2). A combustion chamber 2 is defined by a piston 4 that reciprocates in a cylinder 3 and by a gabled combustion chamber ceiling 6 formed by a cylinder head 5. First and second intake conduits 11 and 12 discharge into the combustion chamber via intake valves 8 and 9 that are inclined relative to the cylinder axis 7. The first and second intake conduits 11 and 12 each extend separately as far as the respective intake valves 8 and 9. The first intake conduit 11 is embodied as a tangential conduit and the second intake conduit 12 as a neutral conduit. Reference numeral 14 designates a central spark plug.

A fuel injection device 16 discharges into the second intake conduit 12, downstream of a throttle device 15 disposed in the second intake conduit 12. Via the throttle device 15, the volumetric flow can be reduced, as a function of engine load, down to a defined minimum flow rate of between 5% and 20% of the maximum flow rate.

As can be seen from the view shown in FIG. 2 in the direction of the cylinder axis 7, the first intake conduit 11 formed as a tangential conduit, because of its orientation to the cylinder wall 3a, creates a flow or stream represented by the arrow 17, which because of its high impetus leads to the development of a swirling motion about the cylinder axis 7. The second intake conduit 12, embodied as a neutral conduit, in which the fuel injection device 16 is disposed, creates a flow of less impetus, represented by the arrow 18, because of the throttling by the throttle device 15; this flow is aimed at the middle cylinder region 19, because of the orientation of the second intake conduit 12.

Reference numeral 20 indicates outlet valves, communicating with the outlet system 21, which are opposed to the intake valves 8 and 9 with respect to the longitudinal center plane 22 defined by the crankshaft axis 1 and the cylinder axis 7.

The center line 11a of the first intake conduit 11, directly at the intake valve 8, forms a larger angle 11b with the longitudinal plane 22 than does the center line 12a of the second intake conduit 12. The angle between the center line 12a and the longitudinal plane 22 is marked 12b. The center line 11a of the first intake conduit 11 also, in the region of the intake valve 8, forms a larger angle 11c with a plane 11d that encloses the cylinder axis 7 and the center of the intake valve, than does the center line 12a of the second intake conduit 12; 12c indicates the angle between the corresponding second plane 12d and the center line 12a. The center line 11a of the first intake conduit 11 also has a larger radius of curvature 24, in the region of the intake valve 8, than does the center line 12a of the second intake conduit 12 in the region of the intake valve 9. The corresponding radius of curvature of the center line 12a is indicated at 25.

Figure 3:
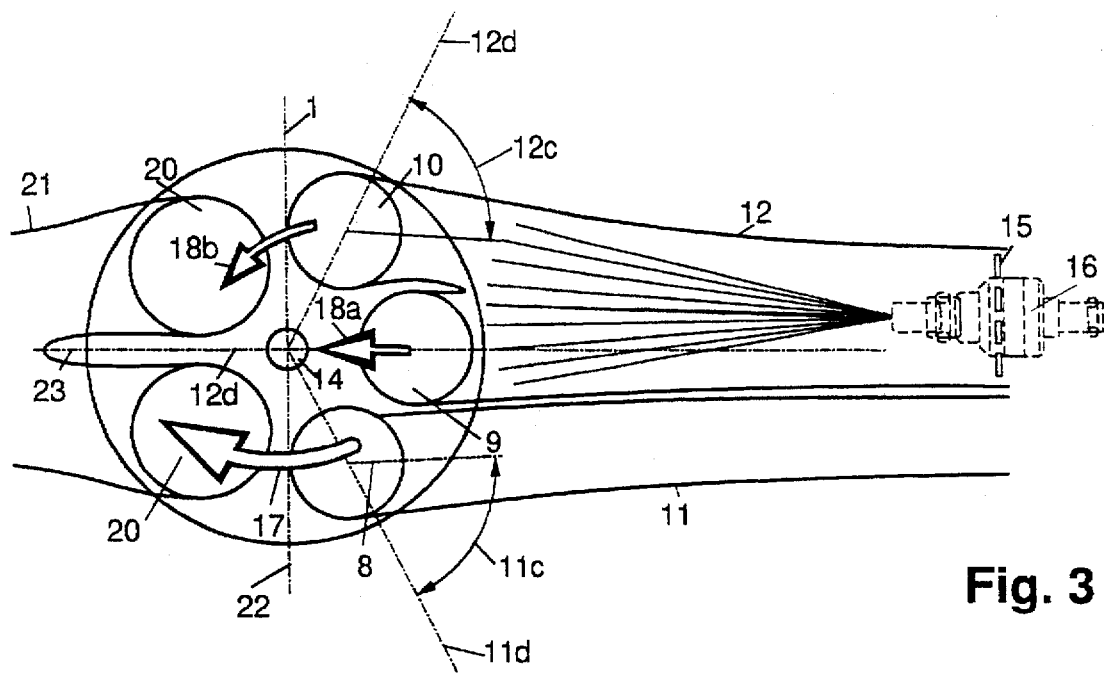
FIGS. 3–7 are similar views of alternative embodiments of the invention.

FIG. 3 shows a corresponding view for an engine with three intake valves 8, 9 and 10; the first intake conduit 11, embodied as a tangential conduit, communicates with an outer intake valve 8, and the second intake conduit 12, embodied as a neutral conduit, communicates with the other two valves 9 and 10; the inlet flow represented by the arrows 17, 18a and 18b is similar to that in the version shown in FIG. 2 with two intake valves.

Figure 4:
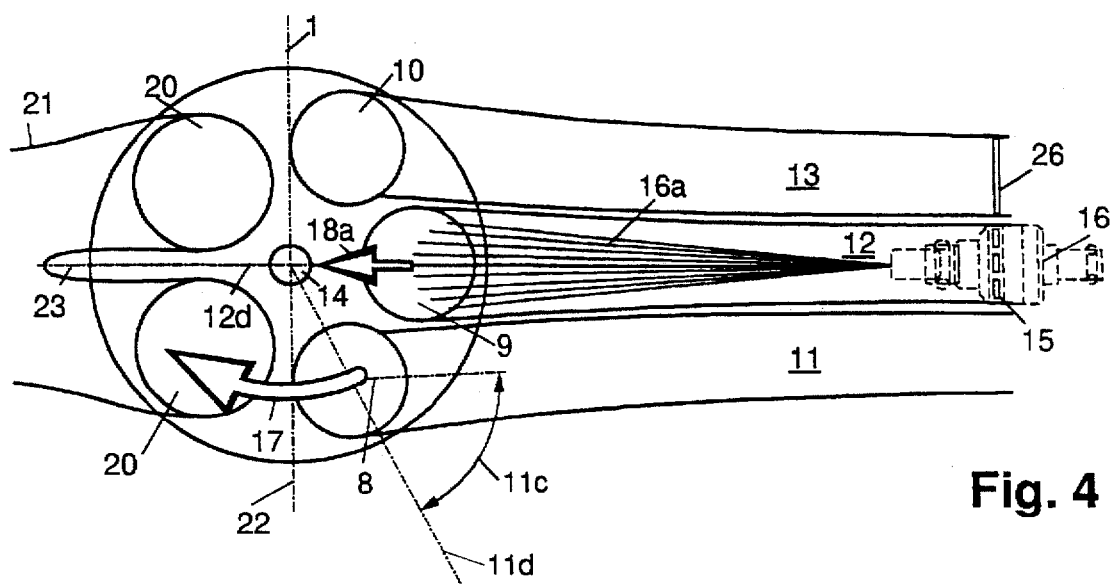

FIG. 4 shows a further version with three intake valves 8, 9 and 10, which each communicate with a first intake conduit 11, a second intake conduit 12, and a third intake conduit 13, respectively. The two outer valves 8 and 10 communicate each with one tangential conduit arranged approximately symmetrically with respect to a normal plane 23 to the crankshaft axis 1, which plane includes the cylinder axis 7; namely, they communicate respectively with the first intake conduit 11 and the third intake conduit 13, and the third intake conduit 13 is equipped with a turnoff device 26, which enables opening of this third intake conduit 13 only at upper partial load and at full load. The middle intake valve 9 communicates with the second intake conduit 12, embodied as a neutral conduit, into which the fuel is injected by the fuel injection device 16, as represented by the fuel streams marked 16a. Because of the symmetrical arrangement relative to the normal plane 23, the fuel 16a is aimed optimally at the cylinder middle 19. Because of the throttle device 15, throttling of the second intake conduit 12 to a defined minimum flow rate can be attained. In this case, the center line of the second intake conduit 12 is located in the second plane 12d; accordingly, the angular difference 12c is zero.

Figure 5:
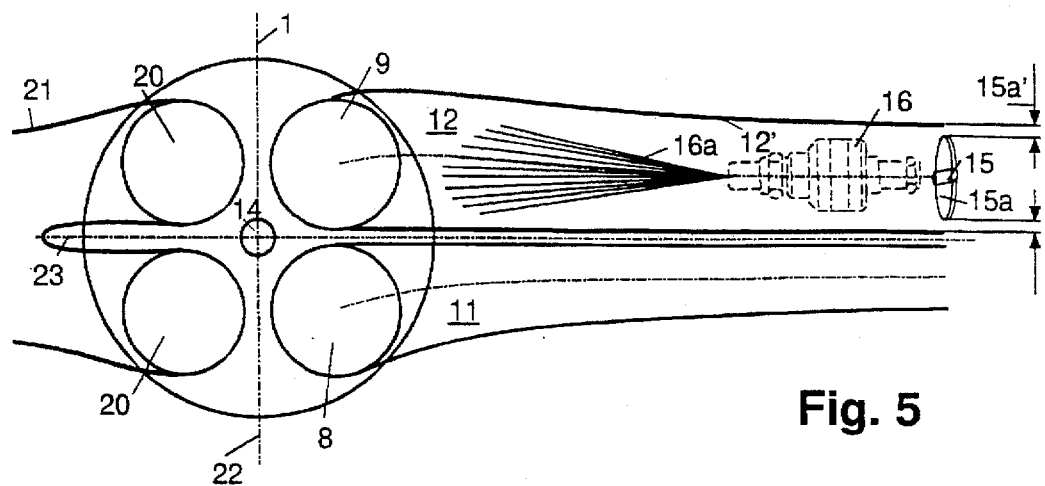
Figure 6:
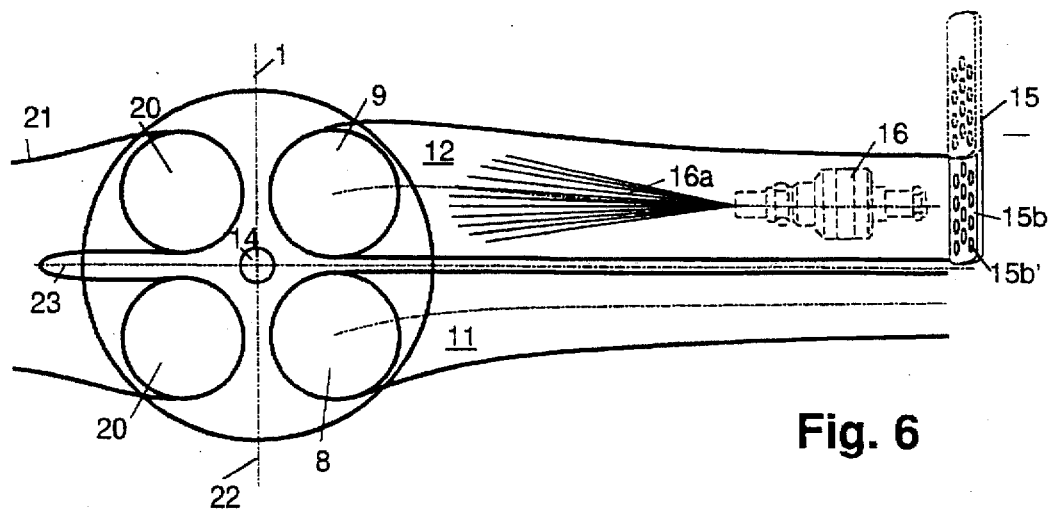
Figure 7:
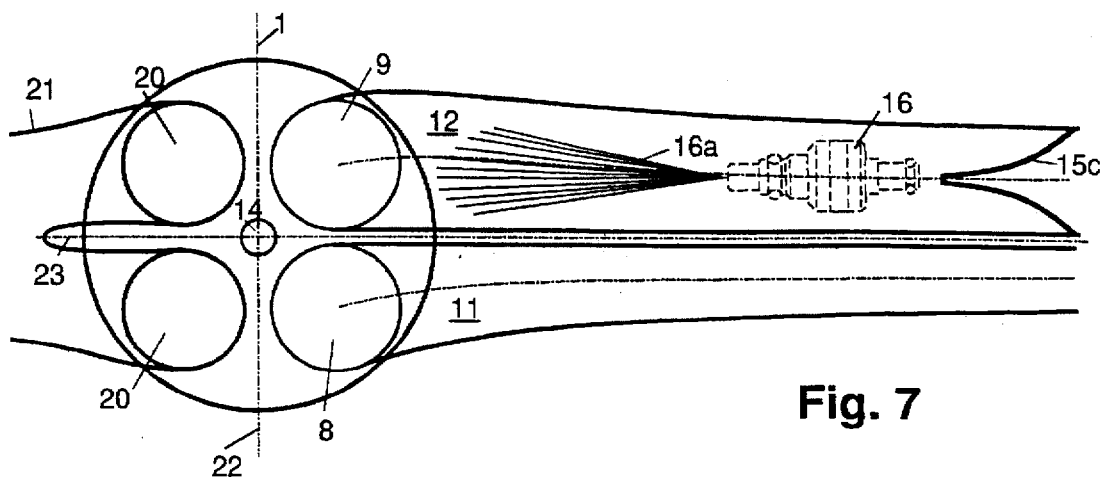

In FIGS. 5, 6 and 7, various exemplary embodiments of throttle devices 15 are shown. In FIG. 5, the throttle device is shown in the form of a throttle valve 15a, with a defined gap 15a' between the valve 15a and the conduit wall 12', in the closed state.

FIG. 6 shows a throttle device 15, embodied as a flat slide 15b, with flow openings 15b' distributed uniformly over its surface. A rotary or roller slide may be used instead of a flat slide 15b.

FIG. 7 shows a throttle device 15 embodied as a diaphragm valve 15c. This diaphragm valve 15c initially prevents the dynamic return flow into the second intake conduit 12 after the opening of the intake valve 9, and it does not open until after an adequate pressure difference has developed between the combustion chamber 2 and the intake tube, not shown in further detail in FIG. 7, thus leading to a delayed inflow of the mixture. The magnitude of the delay depends on the rigidity of the diaphragm 15c.

Figure 8:
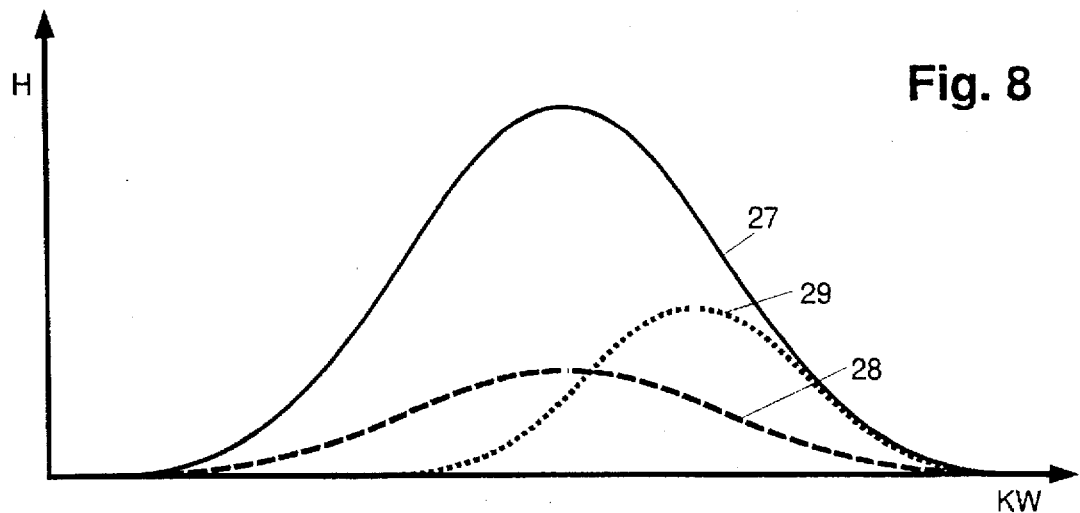
FIG. 8 is a graph plotting a valve stroke over a crankshaft angle.
Figure 9:
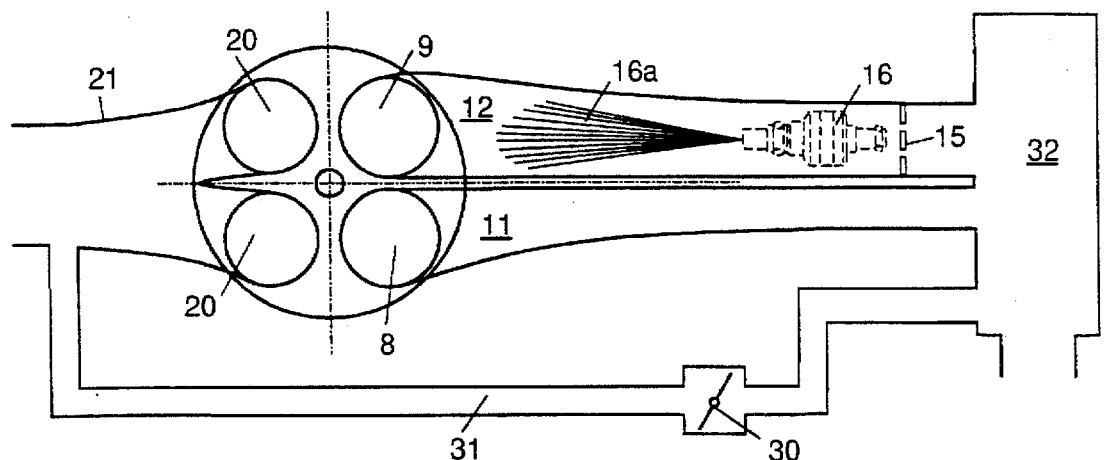
FIG. 9 is a diagrammatic plan view of a further exemplary embodiment of the intake system according to the invention.
Figure 10:
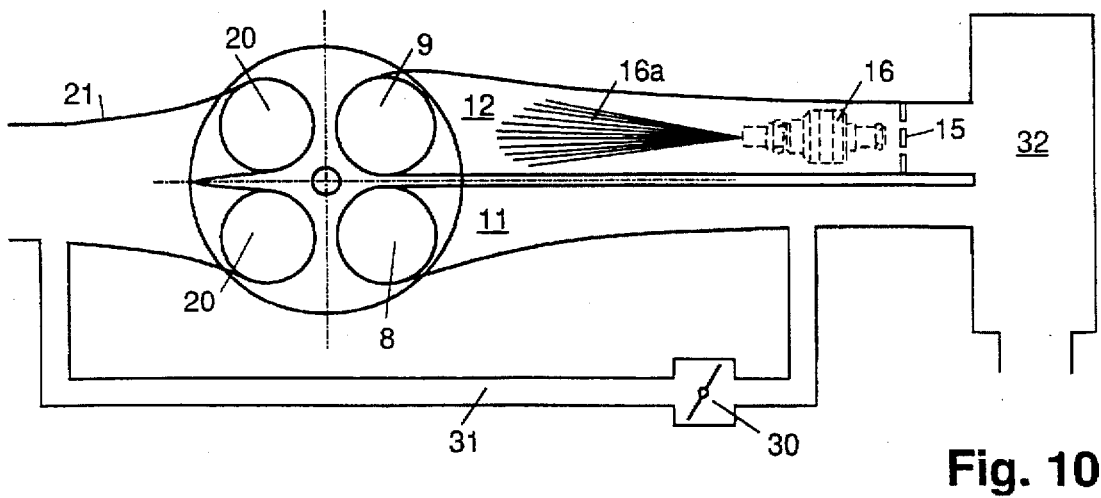
FIG. 10 is a similar view of a concomitant exemplary embodiment thereof.

It is also possible to embody the throttle device 15 as a variable valve controller, as shown in the valve stroke and crankshaft angle graph of FIG. 8. The crankshaft angle KW is plotted on the abscissa. The line 27 represents the initial valve stroke. Reducing the flow is effected either by reducing the valve stroke H to a valve stroke H represented by the line 28, or by reducing the valve stroke H and the valve opening time, as indicated by the curve 29. FIGS. 9 and 10 show two internal combustion engines according to the invention with exhaust gas recirculation. In FIG. 9, the exhaust gas is delivered to the air collector 32, via a regulating device 30 in an exhaust gas recirculation line 31 originating at the outlet system 21, and is simultaneously admixed in all the intake conduits 11 and 12. As an alternative—as shown in FIG. 10—the recirculated exhaust gas may be delivered only to the fuel-valveless first intake conduit 11, in order to attain a more-pronounced layering.

We claim:
1. A four-stroke internal combustion engine, comprising:
 a crankshaft having a crankshaft axis; a plurality of cylinders each having a cylinder axis and enclosing a gabled combustion chamber with a reciprocating piston attached to said crankshaft and a spark plug disposed centrally in said combustion chamber; and at least a first and a second intake valve per cylinder communicating with a respective said combustion chamber;
 a first, unthrottled intake conduit and a second intake conduit respectively leading to said first and second intake valves and each defining a respective center line and a respective radius of curvature;
 wherein—viewed in a direction of said crankshaft axis— the center line of said first intake conduit directly at said intake valve encloses a greater angle with a longitudinal plane defined by said cylinder axis and said crankshaft axis than a center line of said second intake conduit, and
 wherein—viewed in a direction of said cylinder axis—the center line of said first intake conduit at an entrance to said combustion chamber encloses an angle with a first plane defined by said cylinder axis and a center of said first intake valve which is greater than an angle enclosed between the center line of said second intake conduit and a second plane defined by the cylinder axis and the center of said second intake valve;
 a fuel injection valve discharging into said second intake conduit, and a throttle device in said second intake conduit, said throttle device being actuatable as a function of an engine load;
 said throttle device having an open position for a maximum flow rate, and a closed position for a defined minimum flow rate of between approximately 5% and approximately 20% of the maximum flow rate; and
 wherein—viewed in the direction of the crankshaft axis— the center line of said first intake conduit in a vicinity of said first intake valve has a greater radius of curvature than the center line of said second intake conduit.

2. The engine according to claim 1, wherein said throttle device has a closed position for a minimum flow rate of approximately 10% of the maximum flow rate.

3. The engine according to claim 1, wherein said throttle device is a throttle valve, and said first intake conduit has a conduit wall, a conduit cross section, and a conduit circumference, said throttle, in the closed position thereof, defining an annular gap of constant width over the circumference and a defined cross-sectional area of between approximately 5% and approximately 20% of said conduit cross section between said throttle and said conduit wall.

4. The engine according to claim 1, wherein said throttle device is a slide having at least one opening formed therein.

5. The engine according to claim 4, wherein said throttle device is a flat slide.

6. The engine according to claim 4, wherein said throttle device is a rotary slide.

7. The engine according to claim 4, wherein said slide is formed with a plurality of openings distributed uniformly over a surface of said slide.

8. The engine according to claim 1, wherein said throttle device is a variable intake valve controller, and a minimum flow rate is realized by a controlled reduction of a valve stroke thereof and/or a variation in a valve opening time thereof.

9. The engine according to claim 1, wherein said throttle device is a diaphragm valve.

10. The engine according to claim 1, which further comprises a third intake valve adjacent said second intake valve, said second intake conduit communicating with said second and said third intake valves.

11. The engine according to claim 1, which further comprises a third intake valve adjacent said second intake valve, and a third intake conduit, said first, second and third intake conduits being disposed side by side—as seen in the direction of said cylinder axis—and being formed separately from one another to a respective said intake valve, and a turnoff device disposed in said third intake conduit.

12. The engine according to claim 11, wherein said second intake conduit is disposed centrally between said first and third intake conduits.

13. The engine according to claim 11, which further comprises an exhaust gas recirculation line selectively communicating with said first and third intake conduits.

14. The engine according to claim 1, which further comprises an exhaust gas recirculation line selectively communicating with said first intake conduit.

* * * * *

UNITED STATES PATENT AND TRADEMARK OFFICE
CERTIFICATE OF CORRECTION

PATENT NO. : 5,762,041
DATED : June 9, 1998
INVENTOR(S) : Gunter Fraidl et al.

It is certified that error appears in the above-identified patent and that said Letters Patent is hereby corrected as shown below:

<u>Title page,</u>
Item [73] should read as follows:

Assignee: AVL Gesellschaft fuer Verbrennungskraftmschinen und Messtechnik mbH, Graz, Austria Signed and Sealed this Twenty-eighth Day of August, 2001

*Attest:*

*Attesting Officer*

NICHOLAS P. GODICI
*Acting Director of the United States Patent and Trademark Office*